(No Model.)

E. S. M. FERNALD.
TOOL REST FOR LATHES.

No. 286,690. Patented Oct. 16, 1883.

WITNESSES:
Chas. H. Kimball
John P. Lanigan.

INVENTOR:
Edward S. M. Fernald
Per Atty.
William Henry Clifford

UNITED STATES PATENT OFFICE.

EDWARD S. M. FERNALD, OF SACO, MAINE.

TOOL-REST FOR LATHES.

SPECIFICATION forming part of Letters Patent No. 286,690, dated October 16, 1883.

Application filed February 19, 1883. (No model.)

*To all whom it may concern:*

Be it known that I, EDWARD S. M. FERNALD, of Saco, in the county of York and State of Maine, have invented certain new and useful Improvements in Rests for Chucking-Lathes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
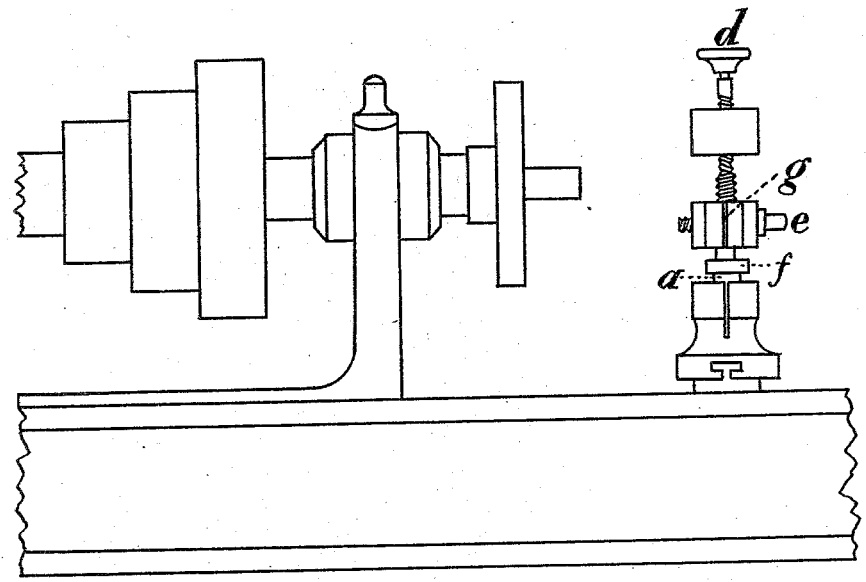
Figure 2:
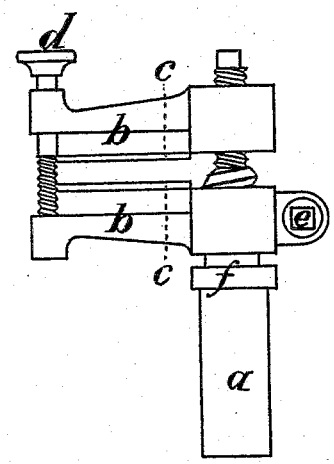
Figure 3:
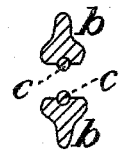

Figure 1 is a view of a portion of a lathe with my improvement thereon. Fig. 2 is a side elevation of my improvement. Fig. 3 is an end view of the jaws with the steel spindles therein.

Same letters show like parts.

My invention relates to rests for chucking lathes.

The object of the invention is to produce a rest for chucking lathes which shall obviate the difficulties now experienced in the use of the common rest. It is now necessary when changing a drill or tool for another of a different size to change the rest also, and the adjustment of the same to the work requires some time and much experience. To obviate this difficulty I have provided a rest which can be so adjusted as to admit of holding drills or tools of different sizes. My rest, when once adjusted to a lathe, is capable of having its jaws opened or closed, to admit different tools to be used, and the tools can be adjusted also on a line with the center of the lathe.

My invention consists in the combination of an upright spindle having a collar, two jaws, right and left hand screws, as herein set forth, two steel spindles, a thumb-screw, and set-screw, as herein set forth.

To accomplish the objects of my invention I make the upright spindle $a$ with a collar turned off, or which can be turned off, to bring the jaws $b\ b$ in a line with the center of the lathe. To open and close the jaws, I cut right and left hand threads or screws on the spindle $a$, with corresponding threads or screws in the ends of the jaws $b\ b$. By turning the jaws $b\ b$ on the spindle $a$ they are made to open or close; or they can be opened or closed by loosening the spindle $a$, when inserted in the tool-post of a lathe, by means of a wrench on the square head at the top of spindle $a$, (holding the jaws $b\ b$ by the hand,) when it can be turned and accomplishes the same result. I also provide on the face of the jaws $b\ b$, to prevent wear, hardened-steel spindles $c\ c$; and to hold them in their proper place I have holes drilled lengthwise of the jaws $b\ b$, and insert the spindles $c\ c$ into said holes, leaving the face of spindles $c\ c$ projecting above the surface of jaws $b\ b$; and to prevent any tool while being used from springing the jaws $b\ b$ apart and out of line of the center of lathe, I provide a thumb-screw, $d$, which I place at the ends of the jaws opposite to those to which the spindle $a$ is attached. Said thumb-screw $d$ passes through a socket on one jaw and screws into a socket on the opposite jaw, and, by screwing the thumb-screw $d$ until its shoulder (under the head) bears against said socket, prevents the jaws $b\ b$ from springing apart. To fasten the jaws $b\ b$ substantially on the spindle $a$, I have provided a set-screw, $e$, on the end of one of the jaws $b\ b$. Said jaw has a projection, which is split into and through to the spindle $a$, and by turning the set-screw $e$ the jaw $b$ is made to clamp the threads of spindle $a$ and prevent the jaws $b\ b$ from turning on the spindle $a$. $f$ is the collar on the spindle $a$. The lower one of the jaws $b\ b$ is split where it forms a socket to fit the screw in the spindle $a$. This split is seen at $g$ in Fig. 1.

What I claim as my invention, and desire to secure by Letters Patent of the United States, is—

In a tool-rest for lathes, the combination of the spindle $a$, having the screw-threaded end, the jaws $b\ b$, having the steel spindles $c\ c$, the set-screw $e$, and the thumb-screw $d$, the whole constructed and operating substantially as shown and described.

In testimony that I claim the foregoing as my own I affix my signature in presence of two witnesses.

EDWARD S. M. FERNALD.

Witnesses:
WILLIAM HENRY CLIFFORD,
JOHN P. KERRIGAN.